Dec. 15, 1942.  W. F. DALZEN  2,305,144
CUTTING TOOL
Filed July 31, 1931
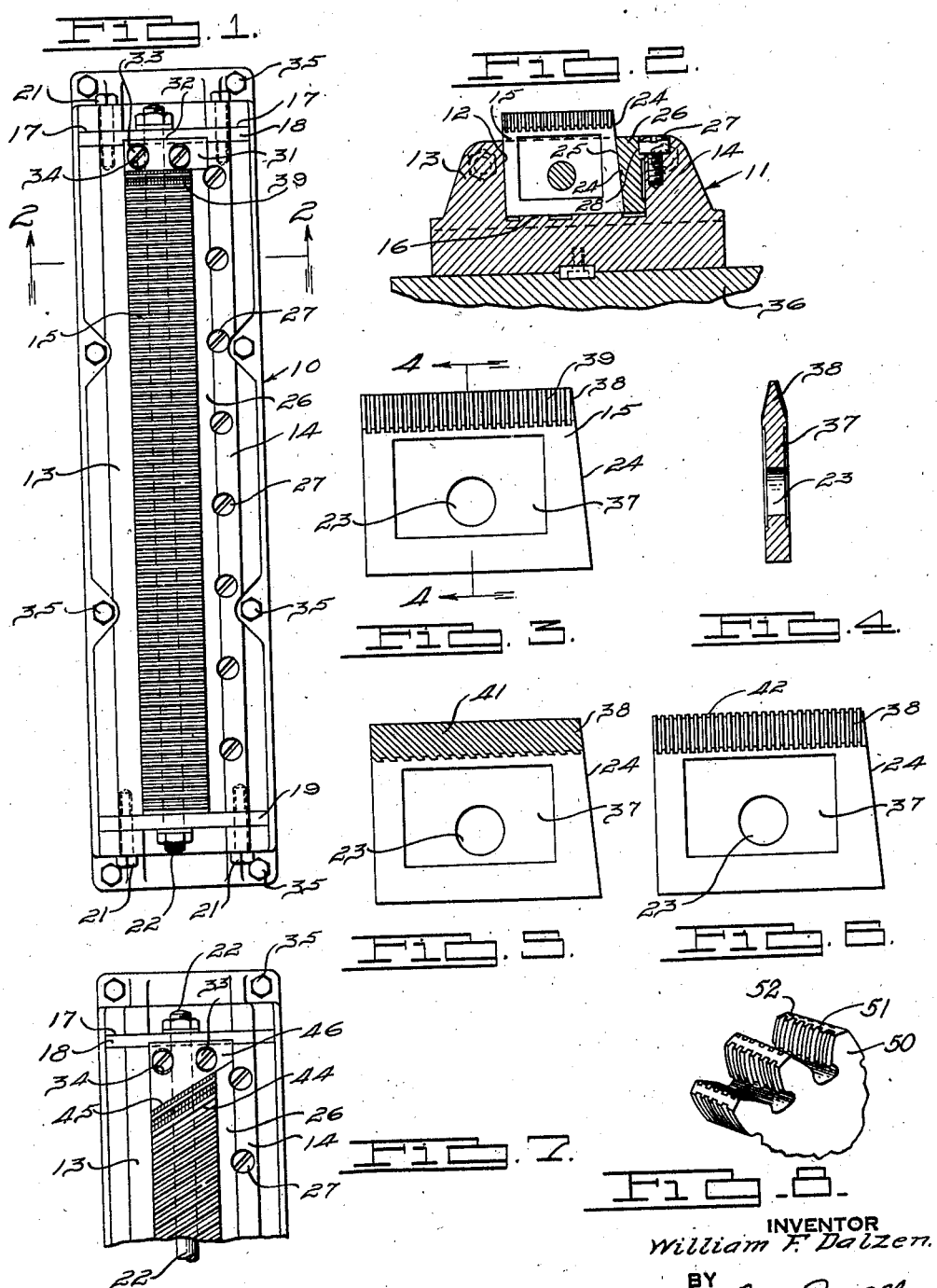
INVENTOR
William F. Dalzen.
BY
Harness, Dickey, Pierce & Hann.
ATTORNEYS.

Patented Dec. 15, 1942

2,305,144

UNITED STATES PATENT OFFICE 2,305,144

CUTTING TOOL

William F. Dalzen, Grosse Pointe, Mich., assignor, by mesne assignments, to Michigan Tool Co., a corporation of Delaware Application July 31, 1931, Serial No. 554,192

4 Claims. (Cl. 29—97)

My invention relates to cutting tools and particularly to a tool for finishing, or roughing and finishing, teeth on gears, sprockets and the like.

It has been the practice, heretofore, to cut teeth on gear blanks by a tooth generating operation wherein the cutter and the gear blank are rotated in timed relation. Expensive machines, which were extremely accurate, were employed for supporting the cutters and the blanks in an attempt to eliminate errors in the tooth shape and dimensions and in the tooth spacing. While the errors were reduced to a minimum, nevertheless, owing to the variation in the hardness of the material at different points about the gear blank, and also because of slight machine errors which are impossible to eliminate, the spacing and the profile of the teeth are not entirely uniform when generated by the present known methods.

When my cutting tool is employed, a gear may be generated which is extremely accurate because of the accuracy with which my tool may be constructed and operated. The profile of the teeth of the cutter are constructed to be exactly the same on both sides and the spacing is in like manner, made to be exact, so that the gears which are finished by my cutting tool will accurately mesh therewith and with each other. My cutting tool eliminates any machine errors from effecting changes in the tooth contour or spacing, as the errors of the machine cannot be introduced between the cutter and gear blank. For this reason the expensive machine, above referred to, need no longer be employed for gear tooth generation and an extremely simple and inexpensive machine may be utilized for effecting the manipulation of my gear cutting tool.

When a formed cutter or grinding wheel is employed for generating teeth on gears, the tooth form is inaccurate because the cutters or grinding wheels are only approximate in contour below the base circle which is well known to be within the working depth of the gear teeth. My present cutter reaches to the full tooth depth and accurately machines a correct profile, regardless of the gear diameter, pitch or pressure angle, and regardless of whether or not the base circle is larger or smaller than the diameter of the gear at the bottom of the tooth gap. It will be further apparent that the teeth of a gear will remain in contact with a greater number of teeth on my cutting tool than will be in contact with a second gear generated in like manner by the tool, and interference between the teeth of the two gears will be impossible.

Accordingly, the present invention has for its main objects: the provision of a cutting tool which machines teeth on a gear blank which are of accurate predetermined contour and spacing throughout the entire periphery of the gear; the provision of a cutting tool which is built up from a plurality of blades having teeth, the surfaces of which are provided with cutting edges; the provision of teeth on ends of a plurality of individual blades which may be assembled in a fixture laterally or angularly thereof to effect rows of teeth having gaps therebetween of predetermined widths; the provision of cutting edges on the sides of the teeth which may be disposed vertically or angularly relative to the blades for dressing the teeth of the gear into exact predetermined contour; the provision of top cutting edges on the teeth which may be disposed laterally or angularly thereacross for effecting the roughing of the teeth, and, in general, of providing a cutting tool with a plurality of teeth having side and top cutting edges for finishing, or roughing and finishing, teeth on a gear blank through the passage of the cutter across the blank while the blank is being pressed into intimate contact therewith and positioned in such manner as to effect a relative lateral movement between the teeth of the blank and cutter for producing teeth on a gear which are of accurate predetermined dimensions.

Other objects and features of novelty of my invention will be either specifically pointed out or will become apparent when referring, for a better understanding of my invention, to the following description in conjunction with the accompanying drawing, wherein:

Figure 1 is a plan view of a cutting tool embodying features of my invention,

Fig. 2 is sectional view of the structure illustrated in Fig. 1, taken on the line 2—2 thereof, Fig. 3 is an enlarged view, in elevation, of one of the cutting blades employed in my cutting tool, Fig. 4 is a sectional view of the structure illustrated in Fig. 3, taken on the line 4—4 thereof, Fig. 5 is an elevational view of a cutter, similar to that illustrated in Fig. 3, showing a modified form thereof, Fig. 6 is a view in elevation of a cutter, similar to that illustrated in Figs. 3 and 5, showing a further modified form thereof.

Fig. 7 is a broken view, in elevation, of a cutter, similar to that illustrated in Fig. 1, showing a modified form thereof.

Fig. 8 is a fragmentary perspective view illustrating a circular or rotary cutter formed in accordance with the teachings of the present invention.

My invention comprises in general, a cutting tool 10 which includes an elongated body portion 11 having a centrally disposed recess 12, formed by the upstanding side portions 13 and 14, in which a plurality of cutting blades 15 are mounted. The base of the recess 12 is provided with a plurality of lands 16 which are accurately machined for positioning the blades 15 in height relative to each other and the body portion 11. Slots 17 are provided across the ends of the upstanding portions 13 and 14 for the reception of the end plates 18 and 19 which are retained in the slots by a plurality of bolts 21.

After a plurality of the cutting blades 15 have been disposed in the recess 12, a bolt 22 is passed centrally through apertures 23 provided in the central body portion of the blades 15 and in the end plates 18 and 19, for retaining the plates in fixed relation to the body portion. One side of the blades 15 is provided with a slope 24 which are engaged by a sloping side 25 of a wedge 26 which is drawn downwardly between the side of the upstanding member 14 and the plurality of plates 15. The adjustment of the wedge is effected by a plurality of screws 27 which are threaded in the upstanding portion 14, the heads of the screws engaging notches 28 in the wedge for forcing the wedge toward the bottom of the recess 12.

The wedge 26 effects the lateral and downward adjustment of the blades 15 in the body portion 11 and a wedge 31, illustrated in Fig. 1 as having a sloping surface which engages a sloping surface 32 provided in the end plate 18, adjusts the blade 15 longitudinally of the body portion. The longitudinal adjustment of the blades is effected by a pair of screws 33, which extend through elongated apertures 34 provided through the body portion of the wedge.

A plurality of bolts 35 extend through the body portion 11 of the cutting tool and are threaded into a longitudinally movable slide 36 of a machine with which my cutting tool is employed. The application of the cutting tool to the machine and the operation of the machine for effecting the cutting of teeth on a gear blank is illustrated and claimed in my co-pending application, Serial No. 554,193 filed on even date herewith (now Patent No. 2,267,692 of Dec. 23, 1941) and assigned to the assignee of the present invention.

Referring to Figs. 3 and 4, I have illustrated a blade 15 as being provided with a body portion 37 upon the upper end of which a tooth 38 is formed, having a plurality of lands and grooves 39 which are constructed to constitute a plurality of cutting edges on the flanks of the tooth. I have illustrated the flanks of the tooth 38 as being straight and disposed angularly to the sides of the body portion 37 and it is to be understood that any form of tooth flank may be provided on each blade, which may be of the true involute, cycloidal or well known form or which may be a modification of the standard tooth form to provide a modified tooth on the gear as cut by my cutting tool.

The tool illustrated in Fig. 1 is intended to be employed for cutting teeth on a spiral gear, that is to say upon a gear having teeth extending diagonally across the surface thereof. The gear blank is preferably roughed out, by a hobbing or similar cutting operation, to provide teeth of rough contour on the periphery of the blank. The blank is mounted on an arbor which is angularly disposed relative to the cutter to have the angularly disposed teeth of the gear in mesh with the teeth of my cutting tool. A pressure is applied to the gear blank to force the roughed out teeth into intimate contact with the teeth of the cutter and the cutter is moved longitudinally through the medium of the slide 36 to effect the rotation of the gear blank.

Because of the relative angular disposition of the gear blank and cutter, the relative lateral movement between the cutter and blank will provide a lateral component which effects the machining of the surface of the teeth of the blank as they move arcuately and laterally across the cutting edges provided on the sides of the teeth of the cutting tool. When the center of the arbor has been moved downwardly during the cutting operation until it is coincident with a predetermined point above the cutting tool, the operation is completed and the teeth of the gear are machined to predetermined dimensions and the gear is machined to a predetermined diameter. By adjusting the supporting arbor for the gear blank angularly, gears having any angular disposition of teeth, whether left or right handed, may be cut with my cutting tool.

In Fig. 5 I have shown a blade 15 in which lands and grooves 41 are disposed at an angle, relative to the top and flanks of the teeth, for providing sloping cutting edges which, under predetermined conditions, increases the cutting speed of the tool. In Fig. 6 I have illustrated lands and grooves 42 as being provided across the top edge of each tooth of the plate for the purpose of cutting the grooves between the teeth of the gear blanks to thereby effect the roughing out of the blank and completely machine the blank into a gear having teeth of predetermined dimensions. While it may not be practical to attempt to entirely machine gear blanks which are constructed from relatively hard material with my cutting tool, nevertheless when relative softer materials are employed in the gear, such for example as soft steel or brass, my cutting tool readily lends itself to the complete cutting operation.

In Fig. 7 I have illustrated a cutting tool which is similar to that illustrated in Fig. 1, with the exception that blades 44 thereof are constructed to have their side edges disposed at an angle so that the blades are positioned angularly relative to the upstanding portions 13 and 14 of the body portion 11 of the cutting tool. The apertures 23 through the center of the blades are likewise disposed at an angle to permit the passage of the bolt 22 therethrough. Similarly the engaging surface 45 of the end block 46, which forces the plurality of blades into intimate longitudinal engagement, is sloped in conformity to the slope at which the blades 44 are to be disposed.

The cutting tool having angular disposed blades is utilized for machining the teeth of a spur gear, that is to say of a gear having the teeth disposed laterally thereacross. It will be readily apparent that in order to have the laterally disposed teeth of the spur gear register with the angularly disposed teeth of the cutting tool, that the spur gear will likewise be disposed angularly relative to the cutter. The longitudinal movement of the cutter will rotate the gear and effect a lateral and arcuate movement to the surface of the gear teeth relative to the teeth of the cutter for effecting the machining of the gear teeth as described above. It is to be understood that the teeth of the blades 44 may be constructed in the same manner as those illustrated and described above with reference to Figs. 1 to 6 inclusive.

It is to be further understood that the tooth portion 38 of the blade 15, may be reduced in width from that of the body portion 37 in order to provide gaps between the teeth, which are greater in width than the width of the teeth to be cut on the gear. Teeth are roughed out on the gear blank and disposed in the gaps between the teeth on the cutter in mated relation therewith and angularly disposed relative to the movement of the cutter, as referred to hereinabove, for effecting the lateral movement between the teeth of the cutter and those of the gear. A brake is applied to the gear so that the longitudinal passage of the cutter thereacross will rotate the gear through the engagement of the flanks on one side of the teeth of the cutter with the flanks on one side of the teeth of the gear to machine the flanks on one side of the gear during one lateral movement, the reverse movement machining the opposite flank. The reciprocating movement of the cutter, for alternately machining the flanks of the gear teeth, being continued until the desired amount of material is cut therefrom to have the gear teeth machined to exact predetermined dimensions.

It is to be understood that my invention may be extended to a circular cutter having teeth constructed in the manner illustrated in the present flat cutter, for the purpose of effecting the finishing, or roughing and finishing, of the flanks of the teeth of the gear blank through the rotational movement of the cutter rather than the reciprocable motion, as utilized with the cutter described and illustrated in the present application.

My cutting tool accurately machines teeth on a gear independent of the machine upon which it is supported and by which the relative movement between the gear and cutter is effected. The error heretofore introduced by the machine in the tooth shape and spacing during the generating operation is entirely eliminated and a comparatively simple, inexpensive machine may be utilized for supporting and effecting the relative movement between my cutter and a gear blank.

While I have described and illustrated a cutter as being constructed from a plurality of blades, it is to be understood that a solid cutting tool may be constructed with cutting teeth which are disposed in a plane or on the circumference of a circle as above described.

In Fig. 8 of the drawing is illustrated a fragmentary view of a circular or rotary cutting tool embodying the teachings of the present invention. As will be readily apparent, this cutter is made from a solid, integral tool steel member having teeth 50 thereon, the working surfaces of these teeth 50 being provided with vertically extending lands 51 and grooves 52 substantially similar in formation and construction with the lands and grooves 39 described in connection with the rack type tool described above.

When the cutting surface of the teeth becomes dull from use, the cutter is sharpened by having the sides and top edges of the teeth dressed an amount sufficient to produce sharp edges on the sides and top edges of the teeth and to provide the original tooth contour of the cutting tool. This may be accomplished by either individually machining each of the blades after they have been removed from the holder or machining them while forming a unit cutting tool which would be the case when a solid tool is employed.

While I have described and illustrated several embodiments of my invention, it will be apparent to those skilled in the art that various changes, omissions, additions and substitutions may be made therein without departing from the spirit and scope of my invention, as set forth in the accompanying claims.

I claim as my invention:

1. A cutting tool for finishing the teeth of a roughed out gear blank of the type of gears in which meshing gears have parallel axes by relative lateral motion between the teeth of said tool and the teeth of said blank, said tool being substantially in the form of a gear of said type including a rack, said tool having a plurality of spaced teeth conjugate to the teeth of the gear to be finished, said teeth having their major dimension extending generally in the direction of the axis of said tool and being provided with a plurality of spaced grooves in the working faces thereof extending generally vertically of said teeth from the roots to the crests of said teeth, said grooves having side walls intersecting said faces and being of materially less depth than the thickness of said teeth, the edges of said grooves at the intersections between said faces and said side walls constituting cutting edges extending generally vertical of said teeth, the portions of said working faces of said teeth between said grooves on each of said teeth forming lands between said cutting edges, said lands on a face of each of said teeth lying in a common smooth surface and having sufficient area to form guiding surfaces for said cutting edges and provide for relative driving action between said tool and gear blank by contacting the surfaces of the teeth of said blank, the area of said lands being sufficiently small that said cutting edges are effective to cut material from said last mentioned surfaces by relative lateral motion of said cutting edges along said last mentioned surfaces without material burnishing of said last mentioned surface by said lands.

2. A cutting tool for finishing the teeth of a roughed out gear blank of the type of gears in which meshing gears have parallel axes by relative lateral motion between the teeth of said tool and the teeth of said blank, said tool being in the form of a rack, said rack having a plurality of spaced teeth conjugate to the teeth of the gear to be finished, said teeth having their major dimension extending generally in a direction laterally of the length of said rack and being provided with a plurality of spaced grooves in the working faces thereof extending generally vertically of said teeth from the roots to the crests of said teeth, said grooves having side walls intersecting said faces and being of materially less depth than the thickness of said teeth, the edges of said grooves at the intersections between said faces and said side walls constituting cutting edges extending generally vertical of said teeth, the portions of said working faces of said teeth between said grooves on each of said teeth forming lands between said cutting edges, said lands on a face of each of said teeth lying in a common smooth surface and having sufficient area to form guiding surfaces for said cutting edges and provide for relative driving action between said tool and gear blank by contacting the surfaces of the teeth of said blank, the area of said lands being sufficiently small that said cutting edges are effective to cut material from said last mentioned surfaces by relative lateral motion of said cutting edges along said last mentioned surfaces without material burnishing of said last mentioned surface by said lands.

3. A cutting tool for finishing the teeth of a roughed out gear blank of the type of gears in which meshing gears have parallel axes by relative lateral motion between the teeth of said tool and the teeth of said blank, said tool being in the form of a rack, said rack having a plurality of spaced teeth conjugate to the teeth of the gear to be finished, said teeth having their major dimension extending generally in a direction laterally of the length of said rack and being provided with a plurality of spaced grooves in the working faces thereof extending generally vertically of said teeth from the roots to the crests of said teeth, said grooves having side walls intersecting said faces and being of materially less depth than the thickness of said teeth, the edges of said grooves at the intersections between said faces and said side walls constituting cutting edges extending generally vertical of said teeth, the portions of said working faces of said teeth between said grooves on each of said teeth forming lands between said cutting edges, said lands on a face of each of said teeth lying in a common smooth surface and having sufficient area to form guiding surfaces for said cutting edges and provide for relative driving action between said tool and gear blank by contacting the surfaces of the teeth of said blank, the area of said lands being sufficiently small that said cutting edges are effective to cut material from said last mentioned surfaces by relative lateral motion of said cutting edges along said last mentioned surfaces without material burnishing of said last mentioned surface by said lands, said rack being composed of a plurality of plates each having a single rack tooth thereon, said plates being disposed in contacting relation to form said rack and a frame member receiving said plates provided with means for clamping said plates together.

4. A cutting tool for finishing the teeth of a roughed out gear blank of the type of gears in which meshing gears have parallel axes by relative lateral motion between the teeth of said tool and the teeth of said blank, said tool being substantially in the form of a circular gear of said type, said tool having a plurality of integral spaced teeth conjugate to the teeth of the gear to be finished, said teeth having their major dimension extending generally in the direction of the axes of said tool and being provided with a plurality of spaced grooves in the working faces thereof extending generally vertically of said teeth from the roots to the crests of said teeth, said grooves having side walls intersecting said faces and being of materially less depth than the thickness of said teeth, the edges of said grooves at the intersections between said faces and said side walls constituting cutting edges extending generally vertical of said teeth, the portions of said working faces of said teeth between said grooves on each of said teeth forming lands between said cutting edges, said lands on a face of each of said teeth lying in a common smooth surface and having sufficient area to form guiding surfaces for said cutting edges and provide for relative driving action between said tool and gear blank by contacting the surfaces of the teeth of said blank, the area of said lands being sufficiently small that said cutting edges are effective to cut material from said last mentioned surfaces by relative lateral motion of said cutting edges along said last mentioned surfaces without material burnishing of said last mentioned surface by said lands.

WILLIAM F. DALZEN.